(12) United States Patent
Kohli

(10) Patent No.: US 10,902,499 B2
(45) Date of Patent: Jan. 26, 2021

(54) SYSTEMS AND METHODS FOR CAPTURING METADATA FROM VIRTUAL SHOPPING CARTS

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 708 days.

(21) Appl. No.: 15/366,666

(22) Filed: Dec. 1, 2016

(65) Prior Publication Data

US 2018/0158129 A1    Jun. 7, 2018

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0633* (2013.01); *G06Q 30/0224* (2013.01)

(58) Field of Classification Search
CPC ........................................ G06Q 30/0207–0277
See application file for complete search history.

(56) References Cited

U.S. PATENT DOCUMENTS

| | | | | |
|---|---|---|---|---|
| 8,626,575 B1 * | 1/2014 | Gong | .................... | G06Q 30/02 705/14.54 |
| 9,153,141 B1 | 10/2015 | Kane et al. | | |
| 9,247,314 B1 | 1/2016 | Parambath et al. | | |
| 9,286,282 B2 | 3/2016 | Ling et al. | | |
| 9,390,402 B1 | 7/2016 | Kane et al. | | |
| 9,940,660 B2 * | 4/2018 | Goulart | .............. | G06Q 30/0631 |
| 2013/0110624 A1 * | 5/2013 | Mitrovic | ............ | G06Q 30/0261 705/14.53 |
| 2014/0236699 A1 | 8/2014 | Gupta et al. | | |
| 2015/0154519 A1 | 6/2015 | Doolan | | |
| 2016/0117726 A1 | 4/2016 | Lee | | |
| 2016/0189099 A1 | 6/2016 | Iqbal et al. | | |
| 2016/0239867 A1 | 8/2016 | Sinha et al. | | |
| 2016/0314494 A1 | 10/2016 | Dhawan et al. | | |
| 2017/0193591 A1 * | 7/2017 | Narasimhan | ....... | G06Q 30/0633 |

* cited by examiner

Primary Examiner — Yehdega Retta
(74) Attorney, Agent, or Firm — Armstrong Teasdale LLP

(57) ABSTRACT

A metadata capture (MC) computing device including a processor in communication with a memory is provided. The processor receives metadata representative of an abandoned product within a virtual shopping cart associated with a candidate consumer and a first merchant, receives a device identifier associated with the candidate consumer, generates a cart profile associated with the candidate consumer that includes the metadata and the device identifier, compares the cart profile to a merchant criteria of a second merchant, and transmits a cart profile data packet including the metadata, the device identifier, and a recommendation to the second merchant when the cart profile meets the merchant criteria. The second merchant provides an incentive message associated with the abandoned product to the candidate consumer based upon the cart profile data packet.

29 Claims, 7 Drawing Sheets

SYSTEMS AND METHODS FOR CAPTURING METADATA FROM VIRTUAL SHOPPING CARTS

BACKGROUND

The field of the present disclosure relates generally to capturing metadata from virtual shopping carts, and more particularly, network-based systems and methods for targeting consumers based on virtual shopping cart profiles including products placed in such carts but not actually purchased.

In at least some online merchant web sites, and other digital environments, consumers are provided virtual "shopping carts" (also referred to herein as "carts") to enable the consumers to mark one or more products for purchasing. These virtual shopping carts are similar to actual shopping carts in that a consumer can place good(s) in the cart, but can change their minds before purchasing the good(s) and thus, essentially place the good(s) back on the shelf. After "placing" one or more virtual goods within the virtual shopping cart, the consumer may proceed to a checkout process to (i) review the products in the shopping cart, (ii) verify the consumer's address and payment information, and (iii) initiate purchasing the products in the cart. When paying for these goods using a payment card (e.g., a card not present transaction), an authentication process and an authorization process generally occur after initiating the purchase to verify an identity of the consumer and to accept or decline (e.g., due to potential fraud) the purchase. If the purchase is approved by the authentication and authorization processes, the purchase is processed and the purchased products are released or shipped to the consumer.

However, at least some carts or products within the carts may be abandoned during or before the checkout process. As used herein, "abandoned" refers to products removed from a shopping cart without the purchase being processed, products that are left in the shopping cart for a predetermined period of time and are automatically removed from the cart, and/or any other products that are placed within the cart and are ultimately not purchased. For example, a consumer may add a product to his or her cart before deciding the product is too expensive or unnecessary and subsequently removes the product. In another example, the consumer may become frustrated with navigating through an online merchant's store, and therefore abandons his or her cart to shop elsewhere. In yet another example, the consumer's purchase may be declined by the authentication process or the authorization process due to fraud protection rules. The consumer may browse the online merchant for particular products before going to a different merchant to purchase these products (referred to as "window-shopping"). It may be desirable for merchants to identify the consumers with abandoned carts and to better understand the reason the carts are abandoned.

BRIEF DESCRIPTION

In one aspect, a metadata capture (MC) computing device including a processor in communication with a memory is provided. The processor receives metadata representative of an abandoned product within a virtual shopping cart associated with a candidate consumer and a first merchant, receives a device identifier associated with the candidate consumer, generates a cart profile associated with the candidate consumer that includes the metadata and the device identifier, compares the cart profile to a merchant criteria of a second merchant, and transmits a cart profile data packet including the metadata, the device identifier, and a recommendation to the second merchant when the cart profile meets the merchant criteria. The second merchant provides an incentive message associated with the abandoned product to the candidate consumer based upon the cart profile data packet.

In another aspect, a method for capturing metadata associated with virtual shopping carts is provided. The method is at least partially performed by an MC computing device. The method includes receiving metadata representative of an abandoned product within a virtual shopping cart associated with a candidate consumer and a first merchant, receiving a device identifier associated with the candidate consumer, generating a cart profile associated with the candidate consumer, the cart profile including the metadata and the device identifier, comparing the cart profile to a merchant criteria of a second merchant, and transmitting a cart profile data packet including the metadata, the device identifier, and a recommendation to the second merchant when the cart profile meets the merchant criteria. The second merchant provides an incentive message associated with the abandoned product to the candidate consumer based upon the cart profile data packet.

In yet another aspect, at least one non-transitory computer-readable storage media having computer-executable instructions embodied thereon is provided. When executed by at least one processor, the computer-executable instructions cause the processor to receive metadata representative of an abandoned product within a virtual shopping cart associated with a candidate consumer and a first merchant, receive a device identifier associated with the candidate consumer, generate a cart profile associated with the candidate consumer, the cart profile including the metadata and the device identifier, compare the cart profile to a merchant criteria of a second merchant, and transmit a cart profile data packet including the metadata, the device identifier, and a recommendation to the second merchant when the cart profile meets the merchant criteria. The second merchant provides an incentive message associated with the abandoned product to the candidate consumer based upon the cart profile data packet.

BRIEF DESCRIPTION OF THE DRAWINGS

FIG. 1 is a schematic diagram illustrating an example shopping profile system for collecting virtual shopping cart profile data associated with abandoned or failed transactions.

FIG. 2 is an example data flow diagram of the system shown in FIG. 1.

FIG. 3 is an example multi-party payment card system that may be used with the system shown in FIG. 1.

FIG. 4 is an expanded block diagram of an example embodiment of a remote device for use in the system shown in FIG. 1.

FIG. 5 illustrates an example configuration of a host system for use in the system shown in FIG. 1.

FIG. 6 is a flowchart of an example process for targeting consumers using the system shown in FIG. 1.

FIG. 7 is a diagram of components of one or more example computing devices that may be used in embodiments of the described systems and methods.

DETAILED DESCRIPTION

Figure 1:
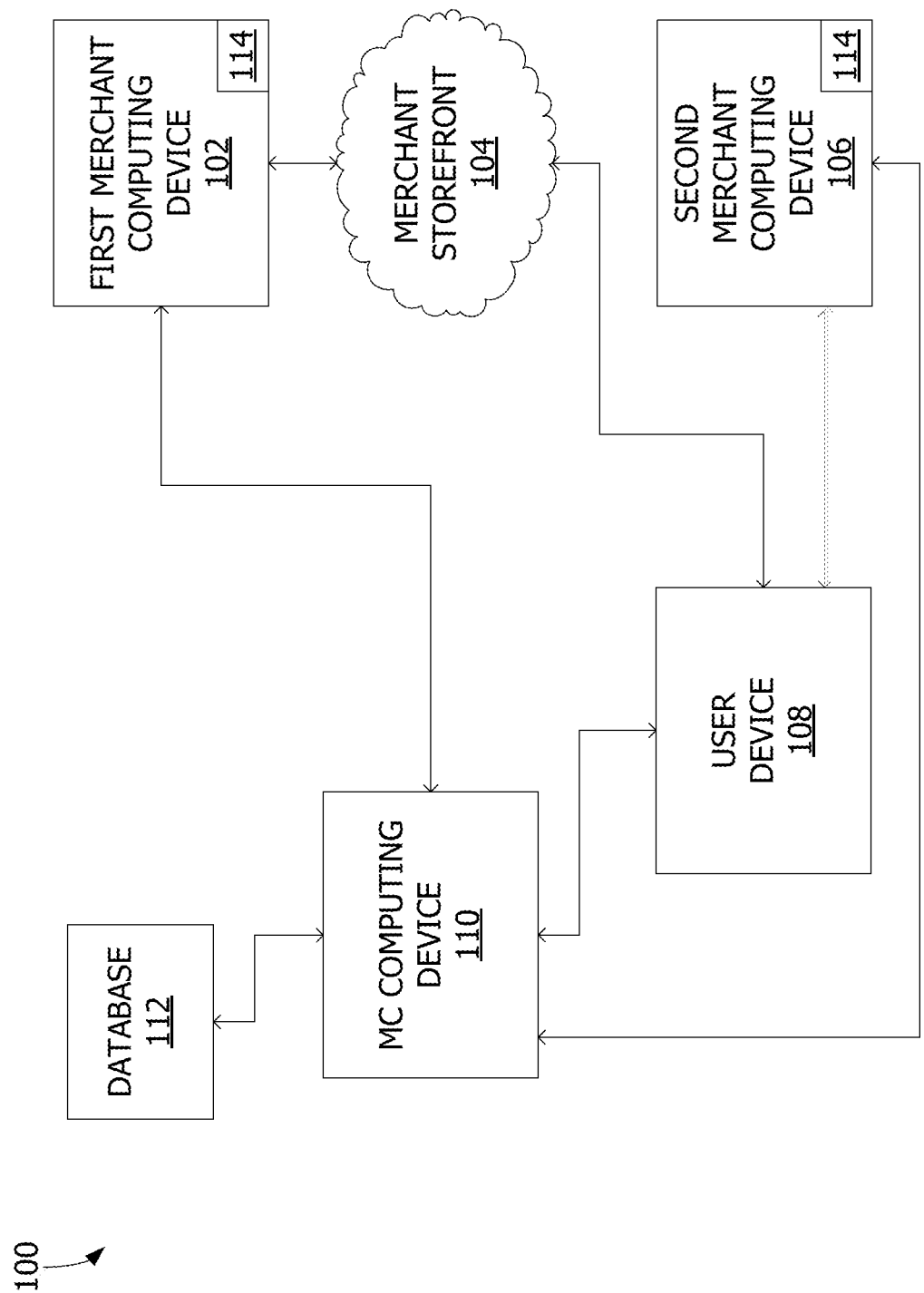
FIGS. 1-7 show example embodiments of the methods and systems described herein.

The following systems and methods described herein relate generally to capturing metadata from virtual shopping carts, and more particularly, to network-based systems and methods for targeting consumers based on virtual shopping cart profiles including products associated with abandoned transactions.

The system (referred to as a "shopping profile system") described herein is configured to collect shopping profile information of consumers to provide targeted product promotions to the consumers. In particular, the system is configured to collect shopping profile information associated with abandoned transactions of consumers and alert subsequent merchants to provide incentives (e.g., discounts, coupons, advertisements, etc.) to the consumers based on the shopping profile information. As used herein, shopping profile information includes data associated with a consumer's purchases, purchasing habits, payment information, and other shopping-related information. Abandoned transactions include, but are not limited to, abandoned shopping carts and/or declined transactions (e.g., due to fraud protection, insufficient funds, errors in the payment network, etc.). An abandoned shopping cart is defined as a virtual shopping cart that includes one or more products that are placed therein that remain unpurchased by the consumer. The determination that a shopping cart is abandoned is made at the expiration of a predetermined period of time or another indicator, such as the consumer leaving the merchant's virtual storefront. The abandoned transactions are within a digital commerce environment, such as card not present (CNP) environments and point-of-sale (POS) environments that facilitate purchases using digital payment methods (e.g., a digital wallet, etc.).

The system includes a metadata capture (MC) computing device. The MC computing device includes a processor in communication with a memory. The MC computing device is also in communication with at least one database for storing information, such as shopping profile information. In the example embodiment, shopping profile information includes cart profile data for abandoned transactions. The cart profile data is metadata that includes information associated with the product(s), consumer, and merchant associated with each abandoned transaction.

For each abandoned transaction, the cart profile data includes, but is not limited to, a merchant identifier, a payment identifier, a consumer identifier, a device identifier, one or more product identifiers, and/or a payment amount. The payment identifier indicates a form of payment (e.g., payment card, electronic wallet, etc.) and/or a payment account selected to make the purchase. The consumer identifier may include the consumer's name, address, and/or username for a user account through the online merchant. The device identifier identifies a particular device or device address (e.g., IP address) used by the consumer to create and abandon the shopping cart. The product identifiers indicate which products were abandoned in the shopping cart. The product identifiers may categorize products to facilitate identifying related products. For example, the products may be placed in categories such as "toys", "kitchenware", "cleaning products", "home improvement products", and so forth. In some embodiments, the cart profile data may indicate a reason for the abandoned transaction. In one example, the cart profile data indicates the transaction was declined due to fraud protection. In another example, the cart profile data indicates the product remained in the cart for more than two days and was automatically removed from the cart.

If a product is placed within a virtual shopping cart of the merchant but does not proceed to a payment process within a payment network within a predefined period of time, the shopping cart is considered abandoned. Although the shopping carts and associated transactions are referred to as abandoned, it is to be understood that cart profile data may also include information associated with partially abandoned carts (i.e., only some products from the shopping cart are abandoned). For example, a consumer may remove a product after deciding the product is too expensive before purchasing the rest of the products in the shopping cart. In other words, any product placed in the cart will have metadata associated with that product that is included in the cart profile data. If one of these products is abandoned, the metadata associated with that abandoned product is also stored within that cart profile data. The cart profile data may also include metadata associated with purchased products.

In the example embodiment, the MC computing device is communicatively coupled to merchant computing devices associated with merchants that are enrolled in a cart profile service. In some embodiments, the merchants are automatically enrolled in the cart profile service. In such embodiments, the merchants are provided the option to opt-out of the cart profile service. In other embodiments, the merchants enroll or opt-in to the cart profile service. During the enrollment of a merchant in the cart profile service, the merchant provides one or more merchant criteria to the MC computing device. The merchant criteria are parameters, such as consumer location, product category, payment amount, payment method, merchant store location, and a competitor identifier (i.e., to identify specific competitors of the merchant), that are used to target specific consumers associated with cart profile data that matches at least some of the merchant criteria. In some embodiments, the MC computing device is configured to also receive a merchant blacklist during the enrollment process that enables a merchant to prevent certain other merchants from utilizing cart profile data associated with the merchant within the cart profile service.

In at least some embodiments, during enrollment of a merchant, the MC computing device is configured to push a software application or a snippet of code to the merchant computing device. In one embodiment, the application or code is installed on the merchant computing device to provide cart profile data to the MC computing device for the cart profile service. In another embodiment, the code is transmitted to a user computing device when the user computing device accesses a virtual storefront of the merchant to cause the user computing device to provide the cart profile data. The code is configured to cause the merchant computing device and/or user computing device to capture metadata associated with virtual shopping carts of the enrolled merchant, such as the cart profile data.

In certain embodiments, the code monitors all virtual shopping carts of the merchant to determine which carts have been abandoned. In such embodiments, the code may be configured to cause the merchant computing device and/or the user computing device to transmit the cart profile data associated with each consumer that is enrolled in the cart profile service to the MC computing device. In other embodiments, the code is configured to cause the merchant computing device and/or the user computing device to transmit the cart profile data associated with enrolled consumer that includes metadata from an abandoned transaction between the consumer and the merchant. Alternatively, the code is configured to detect an abandoned transaction identified by the merchant computing device and/or the user computing device and cause the merchant computing device and/or the user computing device to transmit the cart profile data associated with the abandoned transaction to the MC computing device.

In the example embodiment, the MC computing device and/or the merchant computing devices are configured to prompt a candidate consumer to enroll in the cart profile service. In exchange for permitting the MC computing device to collect cart profile data associated with the candidate consumer, the candidate consumer is provided targeted offers or incentives from the merchants. Alternatively, the candidate consumer may be automatically enrolled in the cart profile service. In such embodiments, the candidate consumer may be provided the option to opt-out of the cart profile service. If the candidate consumer enrolls in the cart profile service, the MC computing device generates a cart profile for the candidate consumer and stores the cart profile within the memory. The cart profile is configured to include cart profile data for abandoned transactions associated with the candidate consumer. In the example embodiment, the consumer provides a user identifier to MC computing device and/or the merchant computing devices. The user identifier may include a consumer identifier, payment identifier, device identifier, and/or other unique identification of the consumer to facilitate the merchant computing device or the MC computing device identifying the consumer when an abandoned transaction is detected.

Once the consumer is enrolled in the cart profile service, the consumer shops at an online merchant store associated with a merchant registered for the cart profile service. In some embodiments, the code pushed the merchant computing device is configured to detect that the consumer is enrolled in the cart profile service. In one embodiment, the code is transmitted to the user computing device of the consumer when the consumer accesses the online storefront through a web browser or an application. In such an embodiment, the code is configured to cause the web browser or application to transmit data (including cart profile data) to the merchant computing device and/or the MC computing device. In another embodiment, the code is installed on the merchant computing device and is configured to monitor access of the online storefront. The code captures cart profile data associated with the virtual shopping cart of the consumer. The merchant computing device associated with the registered merchant or the MC computing device is configured to determine whether an abandoned transaction has occurred.

In one example, the merchant computing device determines a shopping cart of the consumer has been at least partially abandoned. The merchant computing device determines if a product has been removed from the shopping cart or if the product has remained in the shopping cart for a predetermined period of time (e.g., 24 hours). In some embodiments, the merchant computing device may use parameters such as product duration in cart and historical purchasing history of the consumer to determine if the cart has actually been abandoned. In another example, the merchant computing device determines that a transaction initiated by the consumer has been declined. The merchant computing device transmits cart profile data associated with the abandoned transaction and the consumer to the MC computing device. In at least some embodiments, the MC computing device is configured to retrieve a portion of the cart profile data from another computing device, such as an authorization system that declined the abandoned transaction.

In some embodiments, the cart profile data is transmitted to the MC computing device from the merchant computing device irrespective of whether or not an abandoned transaction is detected. In such embodiments, the application is configured to transmit an abandoned transaction identifier to the MC computing device in response to determining that the previously transmitted cart profile data is associated with an abandoned transaction.

The MC computing device is configured to store the cart profile data in the cart profile associated with the consumer. If the cart profile includes cart profile data for multiple transactions (including abandoned transactions), cart profile data for each transaction may be identified separately. Additionally or alternatively, each product of the transactions may be separately identified within the cart profile. Separately identifying products and/or transactions enables the cart profile to be updated (e.g., removing or grouping products) in addition to providing the merchants with specific cart profile data associated with the merchant criteria.

In certain embodiments, the candidate cardholder is provided access to the cart profile through an application installed on a user device of the candidate consumer or a web interface of the MC computing device. The MC computing device is configured to enable the candidate consumer to adjust and configure the cart profile according to his or her requirements. In one example, the candidate consumer removes a product that the candidate consumer does not want. In another example, if the candidate consumer does not want to be contacted by merchants for a particular product or product category (e.g., medication), the candidate consumer configures the cart profile to prevent any merchant contact regarding the product or product category.

In the example embodiment, the MC computing device is configured to determine if the cart profile of the consumer meets any merchant criteria of the registered merchants by comparing the cart profile to the merchant criteria of one or more registered merchants. For example, if the cart profile includes cart profile data indicating a piece of formal clothing was abandoned by the consumer, merchants that sell formal clothing may be interested in attracting the consumer. In at least one embodiment, the MC computing device is configured to detect whether the candidate consumer is attempting to access an online or physical merchant storefront. The MC computing device receives location data associated with the candidate consumer from the user device of the consumer. In some embodiments, the location data is received directly from the user device associated with an enrolled consumer and/or from the merchant computing device. For physical locations, the location data includes geolocation coordinates of the consumer or the consumer's computing device (e.g., a smartphone or other mobile computing device). If the location data indicates the candidate consumer is near or within a physical merchant storefront, the MC computing device may transmit the cart profile data packet to the corresponding merchant. For online access, the MC computing device or the merchant computing device detects a user account, IP address, or other identifier associated with the candidate consumer. In one example, the merchant computing device detects the candidate consumer when the consumer accesses an online storefront of the merchant. The merchant computing device is configured to request cart profile data associated with the candidate consumer from the MC computing device when the candidate consumer is detected.

The MC computing device is configured to transmit a cart profile data packet associated with the candidate consumer to one or more registered merchants with matching merchant criteria. The cart profile data packet may be transmitted when the consumer is accessing or near a merchant storefront of a merchant that has matching merchant criteria. The cart profile data packet identifies the candidate consumer for the merchant and one or more products of abandoned transactions from the cart profile. In particular, the cart profile data packet includes metadata from the cart profile, a device identifier associated with the candidate consumer, and a recommendation. In at least some embodiments, the device identifier includes contact information for the candidate cardholder, such as the cardholder's user account with the merchant, the cardholder's email address, or the cardholder's phone number. The recommendation suggests to a merchant a course of action with respect to the candidate consumer. Based on the cart profile data packet, the merchant computing device pushes an incentive message (e.g., an offer, a coupon, a discount, an advertisement, etc.) to the candidate consumer to attempt to attract the candidate consumer into buying a product from a previous abandoned transaction or a related product at the merchant. In certain embodiments, the MC computing device is configured to push the incentive message to candidate consumer on behalf of the merchant.

In some embodiments, if the candidate consumer accepts the incentive or otherwise purchases a product with the incentive, the MC computing device is configured to update the cart profile to remove or block the cart profile data associated with the purchased product from the cart profile to prevent the candidate consumer from receiving unwanted incentives from merchants. For example, if the abandoned product was a lawn rake, the candidate consumer receives a coupon from a merchant when the consumer visits the merchant's store. The candidate consumer purchases the lawn rake with the coupon. Rather than continuing to cause the merchant to transmit coupons for lawn rakes each time the consumer visits the merchant, the MC computing device removes the lawn rake from the cart profile data to prevent subsequent cart profile data packets to be transmitted.

The methods and systems described herein may be implemented using computer programming or engineering techniques including computer software, firmware, hardware or any combination or subset thereof, wherein the technical effects may be achieved by performing one of the following steps: (i) metadata representative of an abandoned product within a virtual shopping cart associated with a candidate consumer and a first merchant; (ii) receiving a device identifier associated with the candidate consumer; (iii) generating a cart profile associated with the candidate consumer, the cart profile including the metadata and the device identifier; (iv) comparing the cart profile to a merchant criteria of a second merchant; and (v) transmitting a cart profile data packet including the metadata, the device identifier, and a recommendation to the second merchant when the cart profile meets the merchant criteria, wherein the second merchant provides an incentive message associated with the abandoned product to the candidate consumer based upon the cart profile data packet.

The systems and methods described herein are configured to facilitate (a) proactive identification of relevant consumers for a merchant; (b) shared historical data transmitted between merchants to enable identifying relevant consumers even without the consumers shopping at a merchant previously; (c) increased incentives to purchase products of an abandoned transaction; and (d) improved knowledge of abandoned transactions and the reasons causing the transaction to remain unauthorized.

Described herein are computer systems such as a payment processor, a user device, and a data mapping computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticate remote purchases via a user device.

FIG. 1 is a schematic diagram illustrating an example shopping cart profile system 100 for collecting cart profile data of consumers and providing the cart profile data to merchants to facilitate targeting potential consumers. In the example embodiment, system 100 includes a first merchant computing device 102, a first merchant storefront 104, a second merchant computing device 106, a user device 108, an MC computing device 110, and a database 112. In other embodiments, system 100 includes additional, fewer, or alternative devices, including those described elsewhere herein.

First merchant computing device 102 and first merchant storefront 104 are associated with a first merchant. In the example embodiment, first merchant storefront 104 is a digital storefront that is remotely accessible by consumers through a web interface or an application program interface (API). A virtual or digital shopping cart (not shown) is provided to consumers through first merchant storefront 104 to enable consumers to select items within storefront 104 and purchase the selected items all at once. In other embodiments, first merchant storefront 104 is a physical storefront of the first merchant. First merchant computing device 102 is configured to collect and store data associated with first merchant storefront 104 and consumers that use storefront 104, such as transaction data, account data (e.g., a consumer account associated with the first merchant), and other data. Second merchant computing device 106 is associated with a second merchant. The second merchant has a physical and/or digital storefront (not shown) to enable consumers to purchase products. Merchant computing devices 102, 106 are communicatively coupled to MC computing device 110. In some embodiments, additional merchant computing devices associated with other merchants are communicatively coupled to MC computing device 110.

User device 108 is associated with a candidate consumer. In at least some embodiments, user device 108 is a mobile computing device of the candidate consumer. User device 108 includes, but is not limited to, a smartphone, a cell phone, a tablet, a wearable electronic, a laptop, and/or another computing device. User device 108 is communicatively coupled to MC computing device 110. In at least some embodiments, user device 108 is configured to store payment information of the candidate cardholder for making purchases through user device 108. In one example, user device 108 is configured to provide a digital wallet for the candidate consumer.

User device 108 is configured to provide location data that indicates a potential location of the candidate consumer. For example, if user device 108 is carried by the candidate consumer, user device 108 is configured to transmit geolocation coordinates or other data indicative of geolocation coordinates to MC computing device 110 or another computing device (e.g., second merchant computing device 106). In another example, for a digital location, user device 108 is configured to provide an IP address, a token identifier, an account identifier, and/or another digital identifier to merchant computing devices 102, 106 or MC computing device 110. By monitoring location data from user device 108, merchant computing devices 102, 106 and MC computing device 110 can identify a potential physical or digital presence of the candidate cardholder at a merchant storefront.

MC computing device 110 is configured to provide a cart profile service. MC computing device 110 is configured to accumulate data associated with abandoned transactions of consumers and transmit alerts to registered merchants when a registered consumer is near to or present at the merchant's storefront. The abandoned transactions include, but are not limited to, abandoned shopping carts and declined transactions (e.g., due to fraud protection, insufficient funds, etc.). In response to the alert, the merchant can push one or more incentives (e.g., discounts, coupons, advertisements, etc.) to the consumer, such as through user device 108. MC computing device 110 is communicatively coupled to database 112 to store cart profiles, merchant data, and other data associated with the cart profile service. In some embodiments, database 112 is part of MC computing device 110. In other embodiments, database 112 is a remote storage device in communication with MC computing device 110.

In the example embodiment, merchants and consumers can selectively enroll in the cart profile service. In other embodiments, at least some consumers may be automatically enrolled in the cart profile service. In the example embodiment, the first and second merchants and the candidate consumer are enrolled in the cart profile service. During a merchant enrollment process, the merchant provides merchant criteria to MC computing device 110. The merchant criteria are parameters, such as consumer location, product category, payment amount, payment method, merchant store location, and a competitor identifier (i.e., to identify specific competitors of the merchant), that are used to target specific consumers associated with cart profile data that matches or meets at least some of the merchant criteria. In some embodiments, the MC computing device is configured to receive a merchant blacklist during the enrollment process that enables a merchant to prevent certain other merchants from utilizing data collected from the merchant within the cart profile service. The merchant criteria and the merchant blacklist are stored in database 112.

In the example embodiment, once the merchants are enrolled, MC computing device 110 is configured to push code 114 to merchant devices 102, 106. Code 114 is stored on merchant computing devices 102, 106 and configured to capture metadata associated with virtual shopping carts of the merchants (e.g., cart profile data). In one embodiment, code 114 is installed on merchant computing devices 102, 106. For example, code 114 causes merchant computing device 102 to monitor consumers accessing storefront 104. In another embodiment, code 114 is provided with storefront 104 to user device 108 or another device used to access storefront. In such an embodiment, code 114 is configured to cause user device 108 to transmit metadata through a web interface or application to MC computing device 110. Code 114 is configured to detect a consumer accessing merchant storefront 104 that is enrolled in the cart profile service. In some embodiments, MC computing device 110 is configured to provide merchant computing devices 102, 106 with a list of enrolled consumers to perform a lookup for each detected consumer. Alternatively, merchant computing devices 102, 106 are configured to transform a user identifier associated with a detected consumer to MC computing device 110 to perform the lookup. Code 114 is configured to cause first merchant computing device 102 or user device 108 to collect cart profile data of the consumer and determine whether or not the associated virtual shopping cart has been abandoned. Code 114 is further configured to facilitate communication between MC computing device 110 and merchant devices 102, 106. For example, cart profile data and alerts may be transmitted, received, and/or displayed using code 114.

When the candidate consumer enrolls in the cart profile service, MC computing device 110 is configured to generate a cart profile for the candidate consumer and store the cart profile within database 112. The cart profile is configured to include cart profile data for abandoned transactions associated with the candidate consumer. For each abandoned transaction, the cart profile data may include, but is not limited to, a merchant identifier, a payment identifier, a consumer identifier, a device identifier, one or more product identifiers, and/or a payment amount. In one example, the cart profile data indicates the transaction was declined due to fraud protection. In another example, the cart profile data indicates the product remained in the cart for more than two days and was automatically removed from the cart.

In certain embodiments, MC computing device 110 is configured to enable the candidate consumer to access the cart profile of the candidate consumer and configure the cart profile according to his or her requirements. In some embodiments, the candidate consumer accesses the cart profile through an application installed on user device 108 or a web interface of MC computing device 110. In one example, the candidate consumer removes cart profile data associated with a product from the cart profile that the candidate consumer does not want. In another example, if the candidate consumer does not want to be contacted by merchants for a particular product or product category (e.g., medication), the candidate consumer configures the cart profile to prevent any merchant contact regarding the product or product category.

In the example embodiment, the consumer provides a user identifier to MC computing device 110 and/or merchant computing devices 102, 106. The user identifier includes a consumer identifier, payment identifier, device identifier, and/or other unique identification of the consumer to facilitate merchant computing devices 102, 106 or MC computing device 110 identifying the consumer when an abandoned transaction is detected.

Once the first and second merchants and the candidate consumer are enrolled in the cart profile service, the consumer shops at storefront 104. In some embodiments, the consumer accesses storefront 104 through user device 108. Merchant computing device 102 is configured to identify the consumer and determine whether an abandoned transaction has occurred. In some embodiments, merchant computing device 102 is configured to perform a lookup of the consumer with MC computing device 110 to determine if the consumer is registered for the cart profile service. In certain embodiments, merchant computing device 102 uses parameters such as product duration in the cart and historical purchasing history of the consumer to determine if a cart has actually been abandoned. In another example, merchant computing device 102 or MC computing device 110 determines that a transaction initiated by the consumer has been declined. Merchant computing device 102 transmits cart profile data associated with the abandoned transaction and the consumer to MC computing device 110. In at least some embodiments, MC computing device 110 is configured to retrieve a portion of the cart profile data from another computing device, such as an authorization system (not shown) that declined the abandoned transaction or a payment network (not shown in FIG. 1). In one example, MC computing device 110 receives a portion of the cart profile data from an authentication computing device of a payment network and/or a fraud detection system that processed the abandoned transaction.

In one embodiment, merchant computing device 102 transmits cart profile data associated with each enrolled consumer irrespective of whether or not an abandoned transaction has occurred. In such an embodiment, the cart profile data is transmitted periodically or when the corresponding virtual shopping cart has been updated. If the cart profile data is transmitted without identifying an abandoned transaction, merchant computing device 102 is configured to transmit an abandoned transaction identifier (not shown) to MC computing device 110 in response to determining an abandoned transaction has occurred to indicate that the transmitted cart profile data is associated with the abandoned transaction. For example, a candidate consumer adds products from storefront 104 to a virtual shopping cart with the intent to purchase the products. Cart profile data associated with the products in the shopping cart is transmitted to MC computing device 110. However, the transaction for the products is declined due to insufficient funds and subsequently merchant computing device 102 transmits an abandoned transaction identifier to MC computing device 110 to indicate that the cart profile data is associated with the abandoned transaction.

MC computing device 110 is configured to store the cart profile data in the cart profile associated with the consumer. If the cart profile includes cart profile data for multiple transactions (including one or more abandoned transactions), cart profile data for each transaction may be identified separately. Additionally or alternatively, each product of the transactions may be separately identified within the cart profile. Separately identifying products and/or transactions enables the cart profile to be updated (e.g., removing or grouping products) in addition to providing the merchants with specific cart profile data associated with the merchant criteria.

MC computing device 110 is configured to detect a physical and/or digital location of the candidate consumer with respect to a merchant storefront. In one example, MC computing device 110 is configured to detect when the candidate consumer is near or within a storefront of the second merchant. In some embodiments, merchant computing devices 102, 106 are configured to detect the candidate consumer and notify MC computing device 110. For example, when the candidate consumer accesses an online storefront of the second merchant, merchant computing device 106 is configured to detect the candidate consumer and retrieve a user identifier (e.g., a device identifier, an account identifier, etc.) of the candidate consumer. The user identifier is used to determine whether or not the candidate consumer is enrolled in the cart profile service. In the example embodiment, MC computing device 110 is configured to retrieve the merchant criteria of the second merchant and the cart profile of the candidate consumer. MC computing device 110 compares the merchant criteria to the cart profile to determine whether or not at least a portion of the cart profile data of the cart profile meets the merchant criteria. In some embodiments, MC computing device 110 is configured to compare the merchant criteria to the cart profile irrespective of a location of the candidate consumer relative to a merchant storefront.

If no matching merchant criteria or identified, the cart profile of the candidate consumer does not indicate that the candidate consumer is a relevant potential consumer for the second merchant. However, if matching merchant criteria are identified, MC computing device 110 is configured to transmit a cart profile data packet to merchant computing device 106. The cart profile data packet identifies the candidate consumer and includes metadata and a device identifier from the cart profile and a recommendation. In some embodiments, the device identifier includes contact information for the candidate consumer to enable the second merchant to contact the candidate consumer. The recommendation provides a suggested course of action to the merchant (e.g., provide an advertisement for a product category, etc.). In response to the cart profile data packet, the second merchant can push one or more incentives to the candidate consumer to entice the candidate consumer to purchase a product associated with a previous abandoned transaction. The product is complimentary to, supplementary to, or the same as a product from an abandoned transaction. In certain embodiments, MC computing device 110 is configured to transmit the incentive message to the candidate consumer on behalf of the merchant.

In some embodiments, before transmitting the cart profile data packet to merchant computing device 106, MC computing device 110 is configured to detect that the cart profile includes cart profile data provided by the first merchant. If the first merchant provided a merchant blacklist to MC computing device 110, MC computing device 110 is configured to compare the second merchant of merchant computing device 106 to the merchant blacklist. If the second merchant is not on the merchant blacklist, the cart profile data packet is transmitted to merchant computing device 106. If the second merchant is on the merchant blacklist, MC computing device 110 is configured to remove the cart profile data of the first merchant before transmitting the cart profile data packet. In other embodiments, MC computing device 110 is configured to prevent the cart profile data packet from being transmitted to merchant computing device 106 when the second merchant is on the merchant blacklist.

In one embodiment, MC computing device 112 is configured to determine if an incentive provided to the candidate consumer has been accepted or used to purchase a product. MC computing device 112 removes the cart profile data associated with the incentive from the cart profile of the candidate consumer to prevent the consumer from receiving unwanted incentives. In one example, the candidate consumer attempted to buy a ladder at the first merchant but was declined due to insufficient funds. The cart profile of the candidate consumer is updated to include cart profile data associated with the ladder. When the candidate consumer visits a storefront of the second merchant (who also sells ladders), MC computing device transmits a cart profile data packet to the second merchant. The second merchant pushes a discount offer to the candidate consumer for a ladder. If the candidate consumer purchases a ladder using the offer, merchant computing device 106 notifies MC computing device 110. MC computing device 110 is configured remove the cart profile data associated with the ladder from the cart profile of the candidate consumer to prevent additional incentives associated with ladders from being pushed to the consumer. In one embodiment, even if the incentive is not used to make the purchase, MC computing device 110 is configured to detect the purchase of a similar product and remove the cart profile data from the cart profile.

In certain embodiments, the cart profile data may be automatically removed from the cart profile by MC computing device 110 after expiration of a predetermined period of time (e.g., three months). If the candidate consumer has not made a purchase or accepted an incentive for a product of a previous abandoned transaction within the predetermined period of time, the consumer may not be interested in purchasing the product. In one embodiment, MC computing device 112 enables the consumers to adjust the predetermined period of time.

In some embodiments, merchant computing devices 102, 106 are configured to request a report from MC computing device 110 for cart profile data associated with the first and second merchants, respectively. MC computing device 110 is configured to retrieve cart profile data associated with the merchant from one or more cart profiles to generate the report. Once merchant computing devices 102, 106 receive the report, the merchant may analyze the cart profile data to identify potential areas of improvement to their storefronts and/or purchasing experience for consumers. For example, if there are a number of abandoned carts identified within the report, the merchant may review their checkout process to determine if changes to the process are required to reduce the number of abandoned carts.

Figure 2:
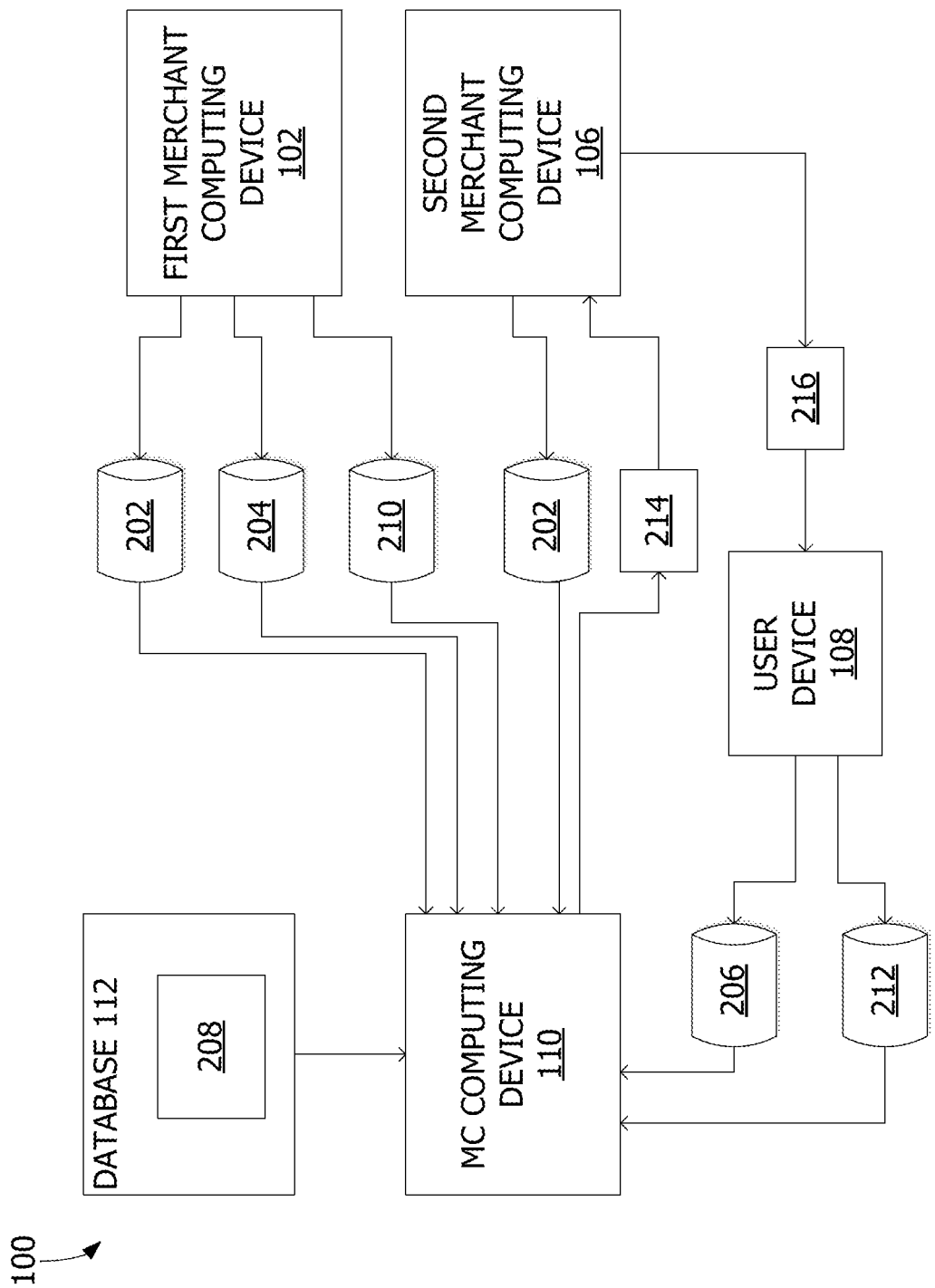

FIG. 2 is an example data flow diagram of system 100 (shown in FIG. 1). In particular, FIG. 2 depicts data flow between merchant computing devices 102, 106, user device 108, MC computing device 110, and database 112.

During a merchant enrollment process, MC computing device 110 is configured to receive merchant criteria 202 from merchant computing devices 102, 106. In the example embodiment, MC computing device also receives a merchant blacklist 204 from first merchant computing device 102. Merchant criteria 202 and merchant blacklist 204 are stored within database 112. Merchant criteria 202 and merchant blacklist 204 are configured to identify the respective merchant. For example, MC computing device 110 is configured to determine which merchant criteria 202 were received from the first merchant.

During a consumer enrollment process, MC computing device 110 is configured to receive a user identifier 206 associated with user device 108 and/or the candidate consumer. In the example embodiment, user identifier 206 includes contact information for the candidate consumer that enables the merchants to contact the consumer with incentives. MC computing device 110 is configured to generate a cart profile 208 associated with the candidate consumer. Cart profile 208 is stored in database 112 with user identifier 206.

MC computing device 110 is configured to receive cart profile data 210 from merchant computing devices 102, 106 and other computing devices. Cart profile data 210 associated with the candidate consumer is stored within cart profile 208 for a predetermined period of time. At the expiration of the predetermined period of time, at least a portion of cart profile data 210 is removed from cart profile 208.

In at least some embodiments, MC computing device 110 and/or merchant computing device 106 is further configured to identify when the candidate consumer is accessing or is otherwise near a merchant storefront associated with the second merchant. In one example, MC computing device 110 receives location data 212 from user device 108 and/or merchant device 106 indicating the candidate consumer is access the merchant storefront of the second merchant. In another example, merchant computing device 106 detects the candidate consumer is accessing an online storefront and determines that the candidate consumer is enrolled in the cart profile service (e.g., performing a lookup of a list of enrolled consumers stored locally or at MC computing device 110). MC computing device 110 then compares cart profile 208 with merchant criteria 202 of the second merchant to determine whether the candidate consumer is relevant to the criteria specified by the second merchant. In some embodiments, MC computing device 110 compares the second merchant to merchant blacklist 204 to determine if the second merchant is restricted from cart profile data 210.

When MC computing device 110 determines that the candidate consumer is relevant to the second merchant based on the comparison of cart profile 208 and merchant criteria 202, MC computing device 110 transmits a cart profile data packet 214 to merchant device 106 that includes at least a portion of cart profile data 210. In response to cart profile data packet 214, merchant device 106 pushes an incentive message 216 to user device 108 of the candidate consumer. MC computing device 110 is configured to remove at least a portion of cart profile data 210 from cart profile 208 when the candidate consumer accepts incentive message 216, uses incentive message 216, and/or purchases a product associated with incentive message 216.

Figure 3:
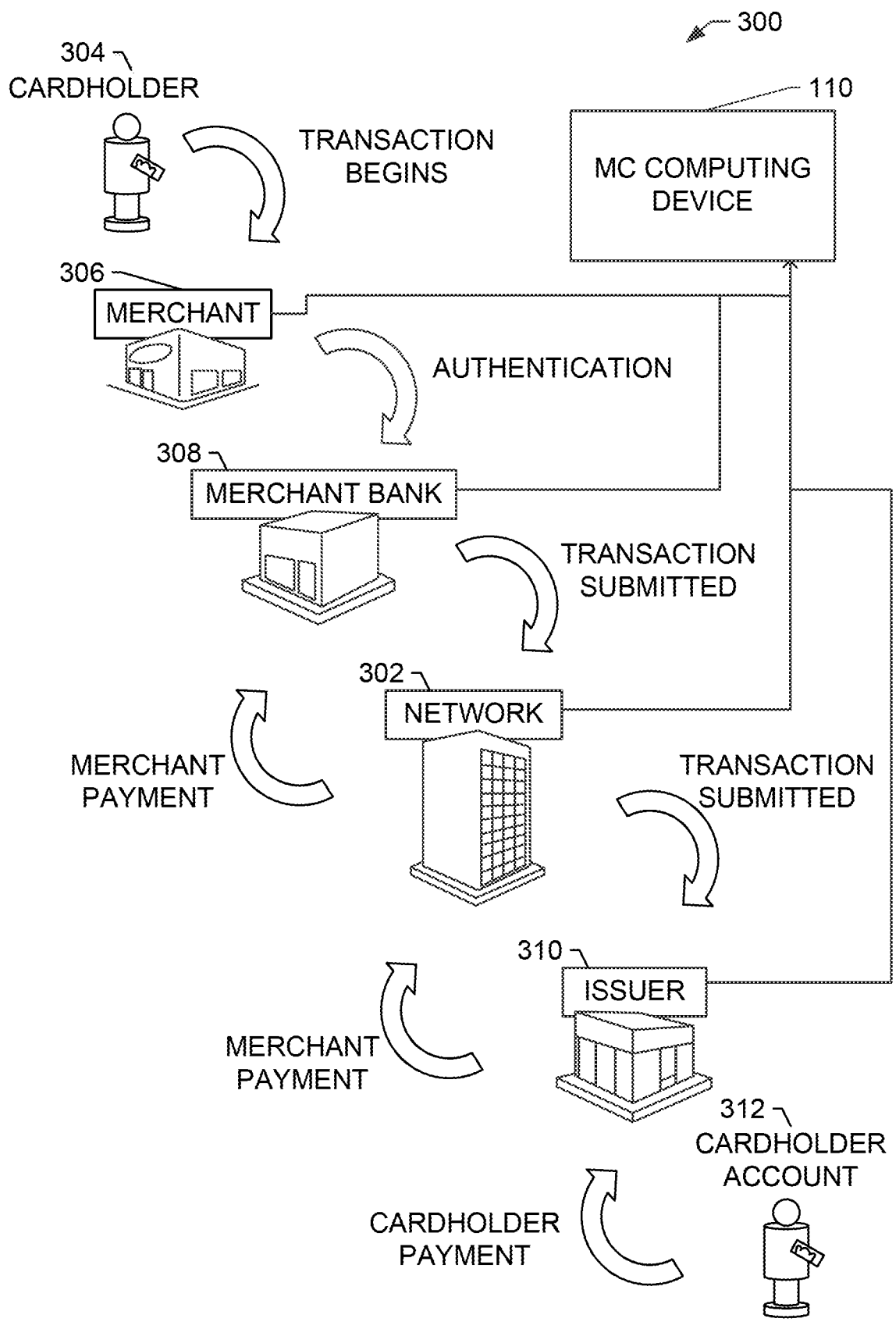

FIG. 3 is a schematic diagram illustrating an example multi-party payment card system 300 that may be used with system 100 (shown in FIG. 1). In particular, system 100 is configured to retrieve data associated with one or more transactions and abandoned transactions from payment card system 300. The present disclosure relates to payment card system 300, such as a credit card payment system using the MasterCard® payment card system payment network 302 (also referred to as an "interchange" or "interchange network"). MasterCard® payment card system payment network 302 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 300, a financial institution such as an issuer 30 issues a payment card for an account, such as a credit card account or a debit card account, to a cardholder 304, who uses the payment card to tender payment for a purchase from a merchant 306. To accept payment with the payment card, merchant 306 must normally establish an account with a financial institution that is part of the financial payment system. This financial institution is usually called the "merchant bank" or the "acquiring bank" or "acquirer bank" or simply "acquirer". When a cardholder 304 tenders payment for a purchase with a payment card (also known as a financial transaction card), merchant 306 requests authorization from acquirer 308 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 308. Alternatively, acquirer 308 may authorize a third party to perform transaction processing on its behalf. In this case, the point-of-interaction terminal will be configured to communicate with the third party. Such a third party is usually called a "merchant processor" or an "acquiring processor."

Using payment card system payment network 302, the computers of acquirer 308 or the merchant processor will communicate with the computers of issuer 310, to determine whether the cardholder's account 312 is in good standing and whether the purchase is covered by the cardholder's available credit line or account balance. Based on these determinations, the request for authorization will be declined or accepted. If the request is accepted, an authorization code is issued to merchant 306.

When a request for authorization is accepted, the available credit line or available balance of cardholder's account 312 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 306 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 312 is decreased. Normally, a charge is posted immediately to cardholder's account 312. The bankcard association then transmits the approval to the acquiring processor for distribution of goods/services, or information or cash in the case of an ATM.

After a transaction is captured, the transaction is settled between merchant 306, acquirer 308, and issuer 310. Settlement refers to the transfer of financial data or funds between the merchant's account, acquirer 308, and issuer 310 related to the transaction. Usually, transactions are captured and accumulated into a "batch," which is settled as a group.

In the example embodiment, MC computing device 110 (shown in FIG. 1) is in communication with payment network 302, merchant 306, acquirer 308, and/or issuer 310 to collect cart profile data. More specifically, MC computing device 110 is configured to retrieve cart profile data in response to an abandoned transaction of a consumer registered for a cart profile service from payment network 302, merchant 306, acquirer 308, and/or issuer 310. For example, issuer 310 may transmit cart profile data if the transaction was declined due to fraud protection rules implemented by issuer 310. In some embodiments, payment network 302 or issuer 310 may notify MC computing device 110 of an abandoned transaction. In one embodiment, after an incentive message is pushed to a candidate consumer, MC computing device 110 is configured to monitor payment network 302 to identify any transactions associated with the candidate consumer and a product within the cart profile data of the consumer's cart profile. When MC computing device 110 identifies such a transaction, the associated cart profile data is removed from the cart profile.

Figure 4:
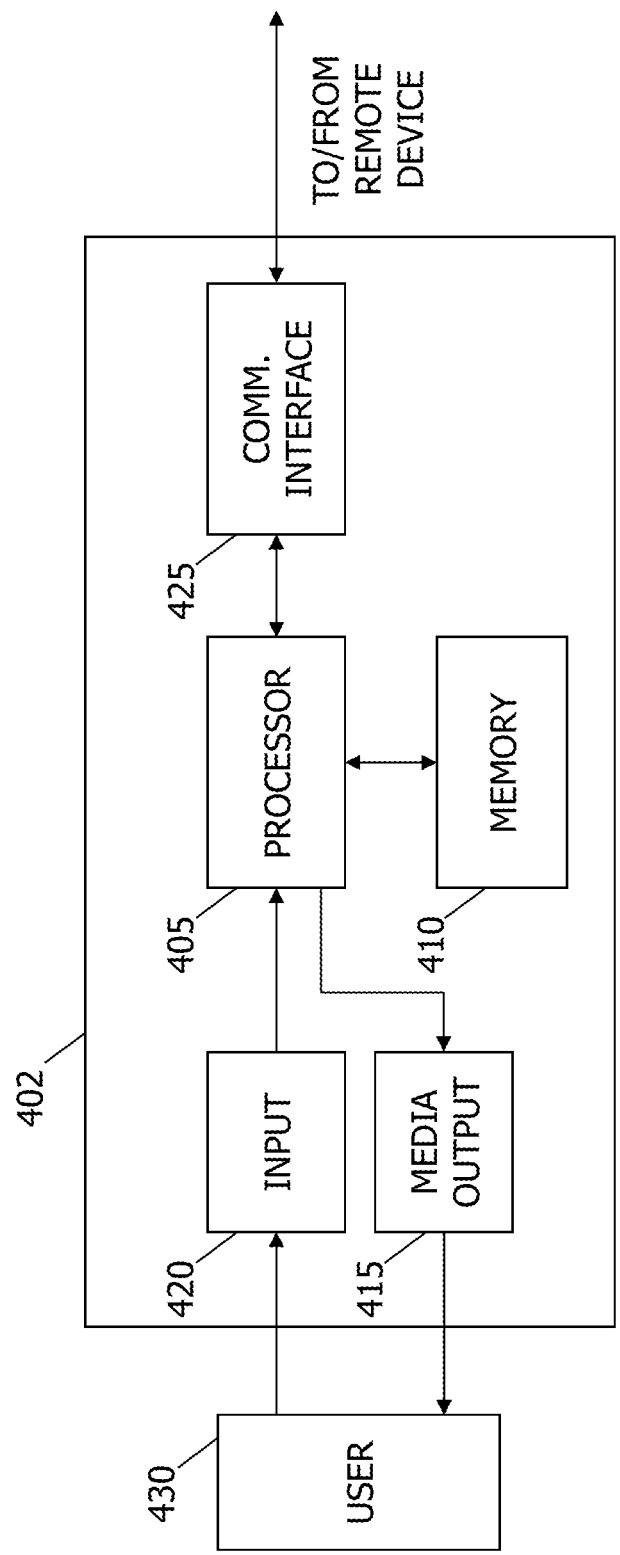

FIG. 4 depicts an exemplary configuration of a remote or user computing device 402, such as merchant devices 102, 106, user device 108 and MC computing device 110 (shown in FIG. 1). Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 may also include a communication interface 425, which may be communicatively coupleable to a remote device such as user device 108 (shown in FIG. 2). Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business.

Figure 5:
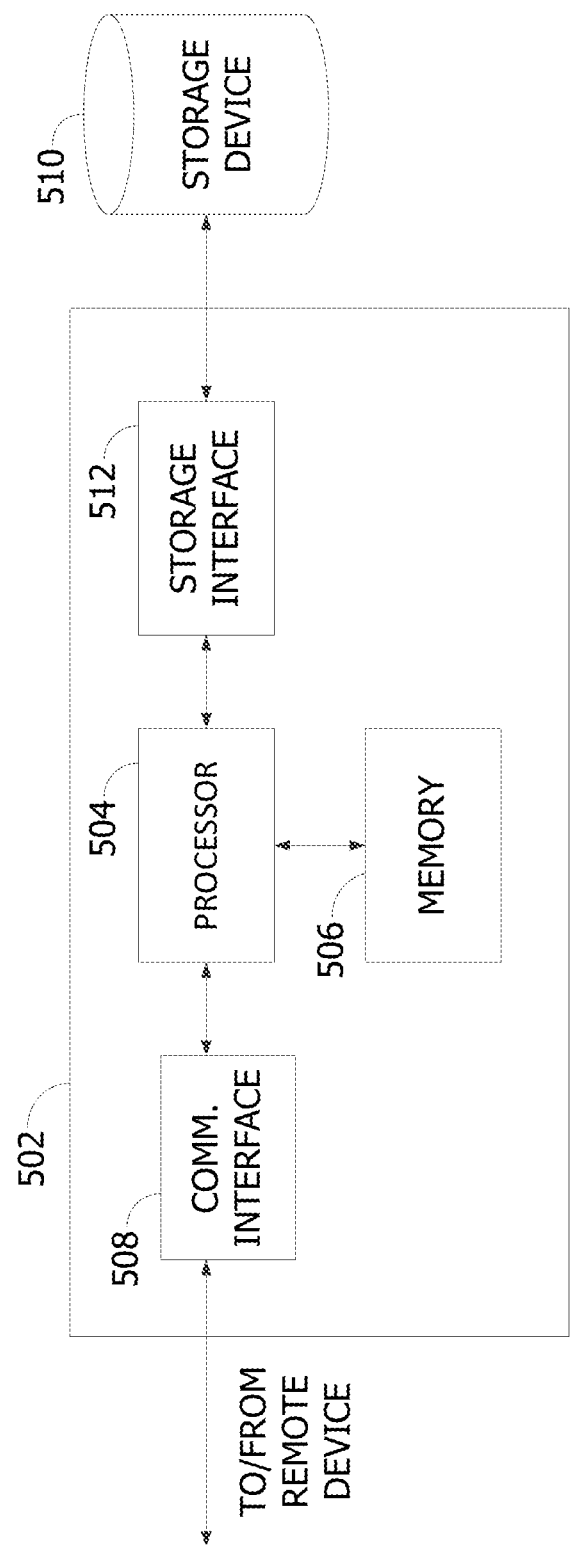

FIG. 5 depicts an exemplary configuration of a host computing device 502, such as merchant devices 102, 106, and MC computing device 110 (shown in FIG. 2). Host computing device 502 may include a processor 505 for executing instructions. Instructions may be stored in a memory area 506, for example. Processor 504 may include one or more processing units (e.g., in a multi-core configuration).

Processor 504 may be operatively coupled to a communication interface 508 such that host computing device 502 may be capable of communicating with a remote device such as computing device 402 shown in FIG. 4 or another host computing device 502. For example, communication interface 508 may receive requests from user computing device 402 via the Internet.

Processor 504 may also be operatively coupled to a storage device 510. Storage device 510 may be any computer-operated hardware suitable for storing and/or retrieving data. In some embodiments, storage device 510 may be integrated in host computing device 502. For example, host computing device 502 may include one or more hard disk drives as storage device 510. In other embodiments, storage device 510 may be external to host computing device 502 and may be accessed by a plurality of host computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 may be operatively coupled to storage device 510 via a storage interface 512. Storage interface 512 may be any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
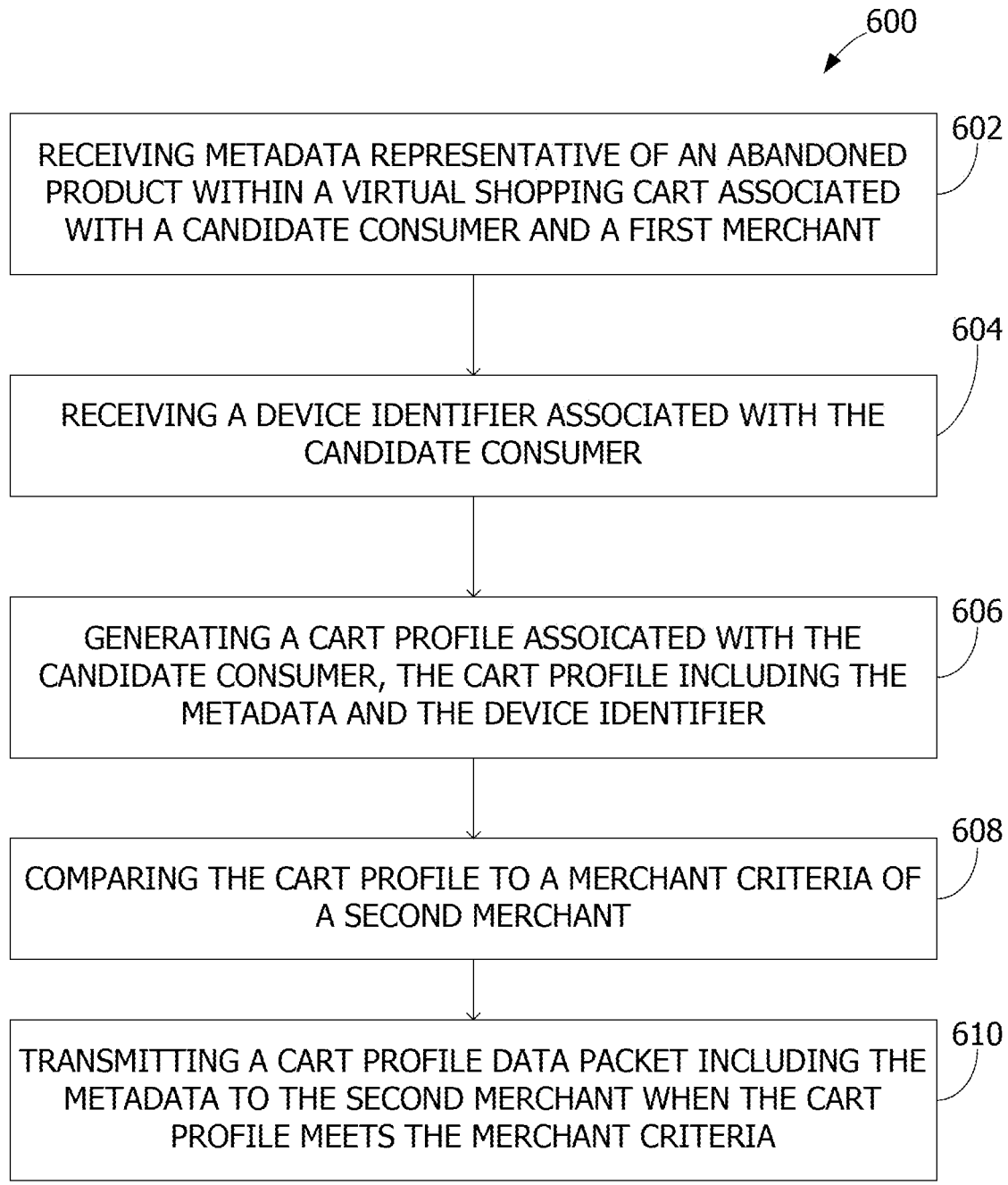

FIG. 6 is a flow diagram of an example method 600 for targeting consumers based on shopping cart profiles using a shopping cart profile system, such as system 100 (shown in FIG. 1). In the example embodiment, method 600 is performed by an MC computing device. In certain embodiments, method 600 may be at least partially performed by a different computing device. In other embodiments, method 600 may include additional, fewer, or alternative steps, including those described elsewhere herein.

In some embodiments, the MC computing device provides a merchant enrollment process and a consumer enrollment process for a cart profile service. Registered merchants provide merchant criteria during enrollment. The registered consumers provide a user identifier associated with the consumer during enrollment. The MC computing device receives 602 metadata (e.g., cart profile data) representative of an abandoned product within a virtual shopping cart associated with a registered candidate consumer and a first merchant. The MC computing device also receives 604 a device identifier associated with the candidate consumer. The device identifier may be the user identifier provided during the consumer enrollment or a device identifier captured with the metadata. The MC computing device generates 606 a cart profile associated with the candidate consumer that includes the metadata and the device identifier. In some embodiments, the cart profile is generated 606 prior to receiving 602 the metadata. In such embodiments, the cart profile is updated to include the received metadata. In other embodiments, the cart profile is generated 606 in response to receiving 602 an initial set of metadata for the candidate consumer.

In the example embodiment, the MC computing device compares 608 the cart profile to merchant criteria of a second merchant registered for the cart profile service. In some embodiments, the MC computing device compares 608 the cart profile to the merchant criteria in response to the candidate consumer approaching or accessing a storefront of the second merchant. In the example embodiment, the MC computing device transmits 610 a cart profile data packet to the second merchant when the cart profile matches or meets the merchant criteria. The cart profile data packet includes the metadata, the device identifier, and a recommendation (e.g., an advertisement for a particular product category, etc.). The second merchant pushes an incentive message associated with the first product to the candidate consumer based upon the cart profile data packet.

Figure 7:
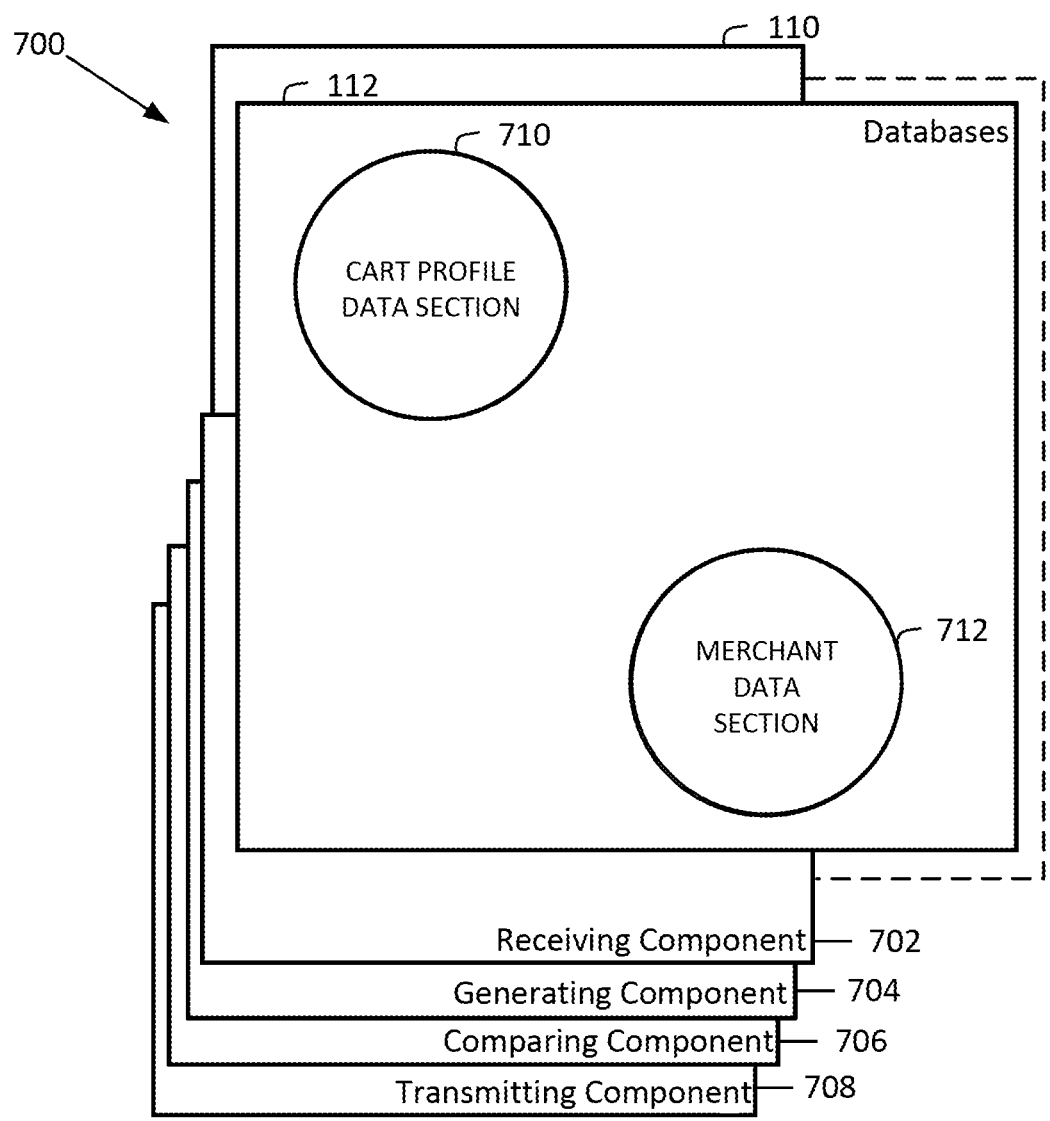

FIG. 7 is a diagram 700 of components of one or more example computing devices that may be used in the method shown in FIG. 6. FIG. 7 further shows a configuration of databases including at least database 112 (shown in FIG. 1). Database 112 is coupled to several separate components within MC computing device 110 (shown in FIG. 1), which perform specific tasks.

MC computing device 110 includes a receiving component 702 configured to receive metadata representative of an abandoned product within a virtual shopping cart associated with a candidate consumer and a first merchant. Receiving computing 702 is also configured to receive a device identifier associated with the candidate consumer. MC computing device 110 further includes a generating computing 704 configured to generate a cart profile associated with the candidate consumer that includes the metadata and the device identifier. MC computing device 110 also includes a comparing component 706 configured to compare the cart profile to a merchant criteria of a merchant. MC computing device 110 further includes a transmitting component 708 configured to transmit a cart profile data packet to the second merchant when the cart profile meets the merchant criteria.

In an example embodiment, database 112 is divided into a plurality of sections, including but not limited to, cart profile section 710, and a merchant data section 712. These sections within database 112 are interconnected to update and retrieve the information as required.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A metadata capture (MC) computing device in communication with a first merchant computing device associated with a first merchant and a second merchant computing device associated with a second merchant, the MC computing device including a processor in communication with a memory, said processor programmed to:

receive a registration request from the first merchant;

transmit, in response to the registration request, computer-executable code to the first merchant computing device for installation on the first merchant computing device, wherein the computer-executable code is configured to cause the first merchant computing device to collect metadata representative of an abandoned product within a virtual shopping cart associated with a candidate consumer and the first merchant;

receive, from the first merchant computing device, a message caused to be transmitted by the computer-executable code, the message including the metadata;

receive a device identifier of a user computing device associated with the candidate consumer;

generate a cart profile associated with the candidate consumer, the cart profile configured to include data for abandoned transactions associated with the candidate consumer, the cart profile including the metadata and the device identifier;

compare the cart profile to each merchant criteria of a plurality of merchants;

determine, from the comparison, that the cart profile meets the merchant criteria of the second merchant of the plurality of merchants, wherein the second merchant is not affiliated with the first merchant; and transmit, in response to the determination, to the second merchant, a cart profile data packet including the metadata, the device identifier, and a recommendation to enable the second merchant to directly provide, to the candidate consumer, an incentive message associated with the abandoned product in response to the cart profile data packet.

2. The MC computing device in accordance with claim 1, wherein the incentive message includes at least one of a discount offer, a coupon, and an advertisement associated with the abandoned product.

3. The MC computing device in accordance with claim 1, wherein said processor is further programmed to:

receive a consumer location identifier indicating at least one of a physical location and a digital location of the candidate consumer;

determine the candidate consumer is accessing a merchant storefront associated with the second merchant based at least partially on the consumer location identifier; and transmit the cart profile data packet to the second merchant in response to determining the candidate consumer is accessing the merchant storefront.

4. The MC computing device in accordance with claim 1, wherein said processor is further programmed to:

receive a merchant blacklist from the first merchant, the merchant blacklist identifying at least one merchant;

compare a third merchant to the merchant blacklist when the cart profile meets a merchant criteria of the third merchant; and prevent the metadata associated with the first merchant from being transmitted to the third merchant when the third merchant is on the merchant blacklist.

5. The MC computing device in accordance with claim 1, wherein said processor is further programmed to receive the merchant criteria from the second merchant during a merchant enrollment process.

6. The MC computing device in accordance with claim 1, wherein said processor is further programmed to identify a location of the candidate consumer based on the received device identifier.

7. The MC computing device in accordance with claim 1, wherein said processor is further programmed to remove the metadata from the cart profile in response to one of an expiration of a predetermined time period associated with the metadata and a purchase associated with the incentive message made by the candidate consumer.

8. The MC computing device in accordance with claim 1, wherein the metadata includes at least one of a merchant identifier, a product identifier, a payment identifier, a payment amount, and an unauthorized reason.

9. The MC computing device in accordance with claim 1, wherein the merchant criteria includes at least one of a product category, a consumer location, a payment amount, a payment method, a merchant store location, and a competitor identifier.

10. The MC computing device in accordance with claim 1, wherein said processor is further programmed to transmit the computer-executable code to the first merchant computing device during a merchant enrollment process.

11. The MC computing device in accordance with claim 1, wherein said processor is further programmed to receive an abandoned transaction identifier from the first merchant computing device after receiving the metadata, the abandoned transaction identifier indicating that the metadata is associated with an abandoned transaction.

12. A method for capturing metadata associated with virtual shopping carts, said method implemented by a metadata capture (MC) computing device in communication with a first merchant computing device associated with a first merchant and a second merchant computing device associated with a second merchant, the MC computing device including a processor in communication with a memory, said method comprising:

receiving, by the MC computing device, a registration request from the first merchant;

transmitting, in response to the registration request, by the MC computing device, computer-executable code to the first merchant computing device for installation on the first merchant computing device, wherein the computer-executable code is configured to cause the first merchant computing device to collect metadata representative of an abandoned product within a virtual shopping cart associated with a candidate consumer and the first merchant;

receiving, from the first merchant computing device, a message caused to be transmitted by the computer-executable code, the message including the metadata;

receiving a device identifier of a user computing device associated with the candidate consumer;

generating, by the MC computing device, a cart profile associated with the candidate consumer, the cart profile configured to include data for abandoned transactions associated with the candidate consumer, the cart profile including the metadata and the device identifier;

comparing the cart profile to each merchant criteria of a plurality of merchants;

determining, from the comparison, that the cart profile meets the merchant criteria of the second merchant of the plurality of merchants, wherein the second merchant is not affiliated with the first merchant; and transmitting, by the MC computing device, in response to the determination, to the second merchant, a cart profile data packet including the metadata, the device identifier, and a recommendation to enable the second merchant to directly provide, to the candidate consumer, an incentive message associated with the abandoned product in response to the cart profile data packet.

13. The method in accordance with claim 12, wherein the incentive message includes at least one of a discount offer, a coupon, and an advertisement associated with the abandoned product.

14. The method in accordance with claim 12, wherein transmitting the cart profile data packet further comprises:

receiving, by the MC computing device, a consumer location identifier indicating at least one of a physical location and a digital location of the candidate consumer;

determining the candidate consumer is accessing a merchant storefront associated with the second merchant based at least partially on the consumer location identifier; and transmitting the cart profile data packet to the second merchant in response to determining the candidate consumer is accessing the merchant storefront.

15. The method in accordance with claim 12 further comprising:

receiving a merchant blacklist from the first merchant, the merchant blacklist identifying at least one merchant;

comparing a third merchant to the merchant blacklist when the cart profile meets a merchant criteria of the third merchant; and preventing the metadata associated with the first merchant from being transmitted to the third merchant when the third merchant is on the merchant blacklist.

16. The method in accordance with claim 12 further comprising receiving the merchant criteria from the second merchant during a merchant enrollment process.

17. The method in accordance with claim 12 further comprising identifying, by the MC computing device, a location of the candidate consumer based on the received device identifier.

18. The method in accordance with claim 12 further comprising removing, by the MC computing device, the metadata from the cart profile in response to one of an expiration of a predetermined time period associated with the metadata and a purchase associated with the incentive message made by the candidate consumer.

19. The method in accordance with claim 12, wherein the metadata includes at least one of a merchant identifier, a product identifier, a payment identifier, a payment amount, and an unauthorized reason.

20. The method in accordance with claim 12, wherein the merchant criteria includes at least one of a product category, a consumer location, a payment amount, a payment method, a merchant store location, and a competitor identifier.

21. The method in accordance with claim 12 further comprising transmitting, by the MC computing device, the computer-executable code to the first merchant computing device during a merchant enrollment process.

22. The method in accordance with claim 12 further comprising receiving, by the MC computing device, an abandoned transaction identifier from the merchant computing device after receiving the metadata, the abandoned transaction identifier indicating that the metadata is associated with an abandoned transaction.

23. At least one non-transitory computer-readable storage media having computer-executable instructions embodied thereon, wherein when executed by a metadata capture (MC) computing device in communication with a first merchant computing device associated with a first merchant and a second merchant computing device associated with a second merchant, the MC computing device including at least one processor, the computer-executable instructions cause the processor to:
receive a registration request from the first merchant;
transmit, in response to the registration request, computer-executable code to the first merchant computing device for installation on the first merchant computing device, wherein the computer-executable code is configured to cause the first merchant computing device to collect metadata representative of an abandoned product within a virtual shopping cart associated with a candidate consumer and the first merchant;
receive, from the first merchant computing device, a message caused to be transmitted by the computer-executable code, the message including the metadata;
receive a device identifier of a user computing device associated with the candidate consumer;
generate a cart profile associated with the candidate consumer, the cart profile configured to include data for abandoned transactions associated with the candidate consumer, the cart profile including the metadata and the device identifier;
compare the cart profile to each merchant criteria of a plurality of merchants;
determine, from the comparison, that the cart profile meets the merchant criteria of the second merchant of the plurality of merchants, wherein the second merchant is not affiliated with the first merchant; and
transmit, in response to the determination, to the second merchant, a cart profile data packet including the metadata, the device identifier, and a recommendation to enable the second merchant to directly provide, to the candidate consumer, an incentive message associated with the abandoned product in response to the cart profile data packet.

24. The computer-readable storage media in accordance with claim 23, wherein the incentive message includes at least one of a discount offer, a coupon, and an advertisement associated with the abandoned product.

25. The computer-readable storage media in accordance with claim 23, wherein the computer-executable instructions further cause the processor to:
receive a consumer location identifier indicating at least one of a physical location and a digital location of the candidate consumer;
determine the candidate consumer is accessing a merchant storefront associated with the second merchant based at least partially on the consumer location identifier; and
transmit the cart profile data packet to the second merchant in response to determining the candidate consumer is accessing the merchant storefront.

26. The computer-readable storage media in accordance with claim 23, wherein the computer-executable instructions further cause the processor to:
receive a merchant blacklist from the first merchant, the merchant blacklist identifying at least one merchant;
compare a third merchant to the merchant blacklist when the cart profile meets a merchant criteria of the third merchant; and
prevent the metadata associated with the first merchant from being transmitted to the third merchant when the third merchant is on the merchant blacklist.

27. The computer-readable storage media in accordance with claim 23, wherein the computer-executable instructions further cause the processor to receive the merchant criteria from the second merchant during a merchant enrollment process.

28. The computer-readable storage media in accordance with claim 23, wherein the computer-executable instructions further cause the processor to identify a location of the candidate consumer based on the received device identifier.

29. The computer-readable storage media in accordance with claim 23, wherein the computer-executable instructions further cause the processor to remove the metadata from the cart profile in response to one of an expiration of a predetermined time period associated with the metadata and a purchase associated with the incentive message made by the candidate consumer.

* * * * *